United States Patent [19]

Nishimura et al.

[11] Patent Number: 4,630,841
[45] Date of Patent: Dec. 23, 1986

[54] WEBBING TENSION ADJUSTING APPARATUS

[75] Inventors: Yuji Nishimura; Shinji Mori; Teruhiko Kawaguchi, all of Niwa, Japan

[73] Assignee: Kabushiki Kaisha Tokai-Rika-Denki-Seisakusho, Aichi, Japan

[21] Appl. No.: 740,426

[22] Filed: Jun. 3, 1985

[30] Foreign Application Priority Data

Jun. 7, 1984 [JP] Japan .............................. 59-85237[U]

[51] Int. Cl.$^4$ ............................................ A62B 35/02
[52] U.S. Cl. ................................... 280/806; 180/268; 242/107
[58] Field of Search ............... 280/802, 801, 806, 808; 242/107, 107.4 A; 180/268

[56] References Cited

U.S. PATENT DOCUMENTS

| | | | |
|---|---|---|---|
| 4,385,737 | 5/1983 | Gilette | 280/808 |
| 4,428,600 | 1/1984 | Doty | 280/802 |
| 4,452,470 | 6/1984 | Doty | 280/802 |
| 4,585,184 | 4/1986 | Kawaguchi et al. | 242/107 |

Primary Examiner—Richard A. Bertsch
Attorney, Agent, or Firm—Parkhurst & Oliff

[57] ABSTRACT

A webbing tension adjusting apparatus for use in a webbing retractor employed in a seatbelt system for a vehicle which is arranged such that one end of an occupant restraining webbing is secured to a door of the vehicle and such that it is possible for an occupant of the vehicle to be automatically secured by the webbing simply by closing the door. When the door is opened, a resilient member for winding up the webbing is disengaged from a takeup shaft by a clutch means, whereby the biasing force of the resilient member which has been applied to the takeup shaft is cancelled. There is therefore no possibility that the webbing which is being wound off from the webbing retractor in response to the door opening operation may rub strongly against the body of the occupant.

22 Claims, 6 Drawing Figures

FIG-6

WEBBING TENSION ADJUSTING APPARATUS

BACKGROUND OF THE INVENTION

1. Field of the Invention

The present invention relates to an apparatus for adjusting the tension of an occupant restraining webbing which is employed in a seatbelt system designed to protect an occupant of a vehicle. More particularly, the invention pertains to a webbing tension adjusting apparatus which is capable of quickly decreasing the webbing tension.

2. Description of the Prior Art

An automatic seatbelt system has heretofore been proposed in which an occupant restraining webbing has one of its ends secured to a door of a vehicle and the other end secured to the approximate center of the vehicle. In this seatbelt system, when an occupant of the vehicle opens the door, the webbing is wound off from a webbing retractor and moved toward the front end of the vehicle in response to the pivoting movement of the opening door. It is therefore possible for the occupant to be automatically fastened by the webbing simply by closing the door after seating himself in the seat.

This type of seatbelt system, however, suffers from the following problem. When the occupant opens the door for the purpose of leaving the vehicle, the webbing which is being wound off from the webbing retractor in response to the door opening operation moves and undesirably rubs against the body of the occupant.

SUMMARY OF THE INVENTION

In view of the above-described fact, it is a primary object of the present invention to provide a webbing tension adjusting apparatus which is capable of decreasing the webbing tension when the occupant leaves the vehicle, thereby eliminating any risk of a large frictional force being produced between the webbing and the body of the occupant.

To this end, the invention provides a webbing tension adjusting apparatus in which a clutch means is disengaged when the door is opened so that the biasing force of a resilient member is prevented from acting on a webbing takeup shaft, thereby making it easy for the occupant to open the door when leaving the vehicle. Further, the apparatus has a winding means which is capable of increasing the biasing force of the resilient member according to need, thereby allowing a desired webbing tension to be obtained by properly increasing the webbing tension.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
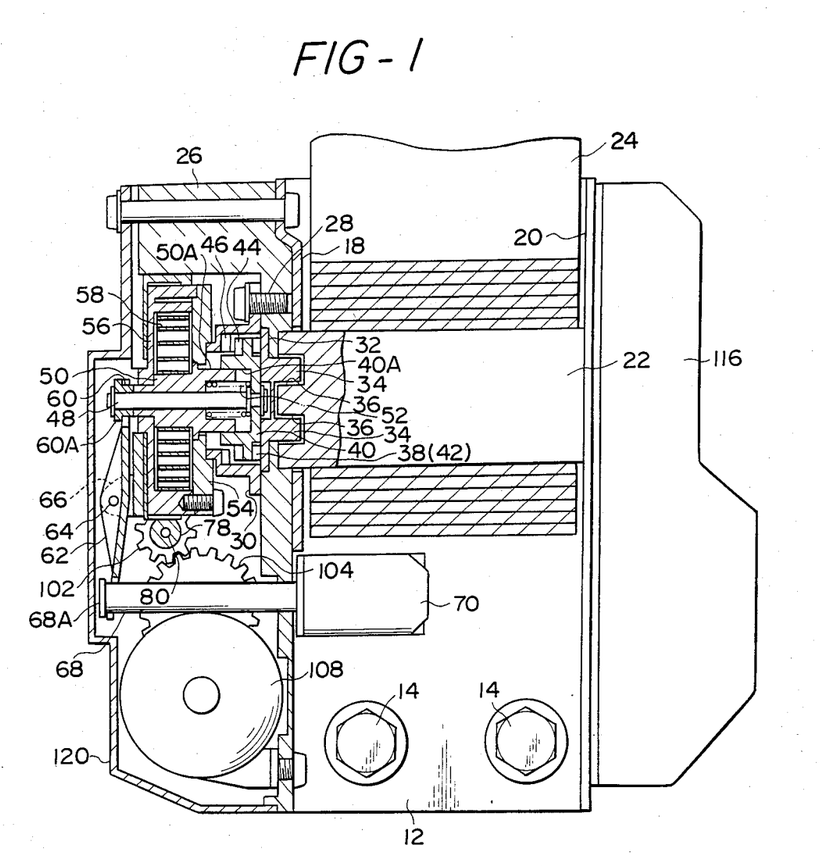
FIG. 1 is a sectional view of a webbing retractor to which one embodiment of the webbing tension adjusting apparatus according to the present invention is applied.
Figure 2:
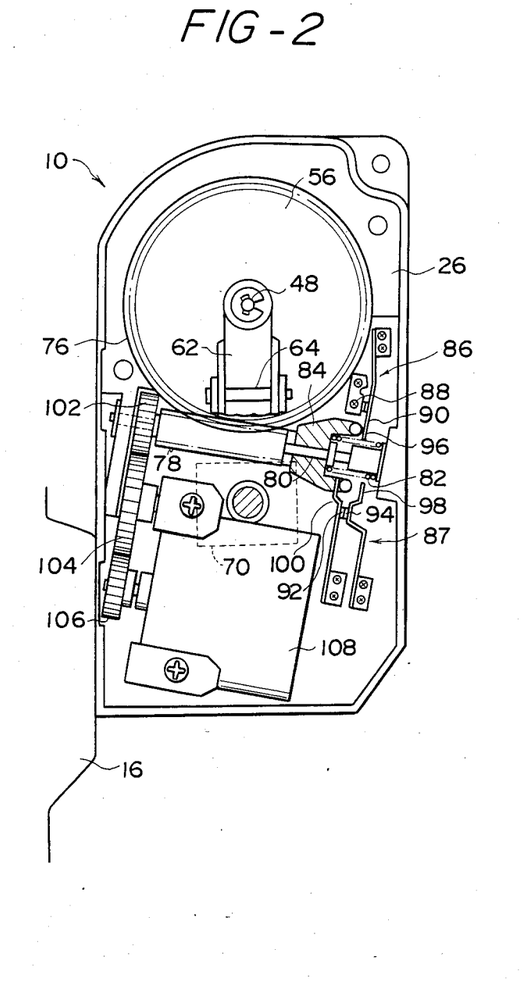
FIG. 2 is a fragmentary side elevational view of the webbing retractor shown in FIG. 1 as viewed from the left-hand side thereof.

Referring first to FIGS. 1 and 2, there is shown a webbing retractor 10 to which one embodiment of the webbing tension adjusting apparatus according to the present invention is applied. The webbing retractor 10 has a frame 12 secured to the body 16 of an automobile by bolts 14 such that the retractor 10 is disposed in the approximate center of the automobile in its widthwise or lateral direction.

The frame 12 has leg plates 18 and 20 respectively extending from both sides thereof in directions orthogonal to the plane of the frame 12. A webbing takeup shaft 22 is rotatably supported by the leg plates 18 and 20. An occupant restraining webbing 24 has one end thereof retained at the center of the webbing takeup shaft 22 and is wound up in layers on the takeup shaft 22. The other end (not shown) of the webbing 24 is secured to a door of the automobile, whereby tensile force is applied to the webbing 24 when the door is opened.

Figure 3:
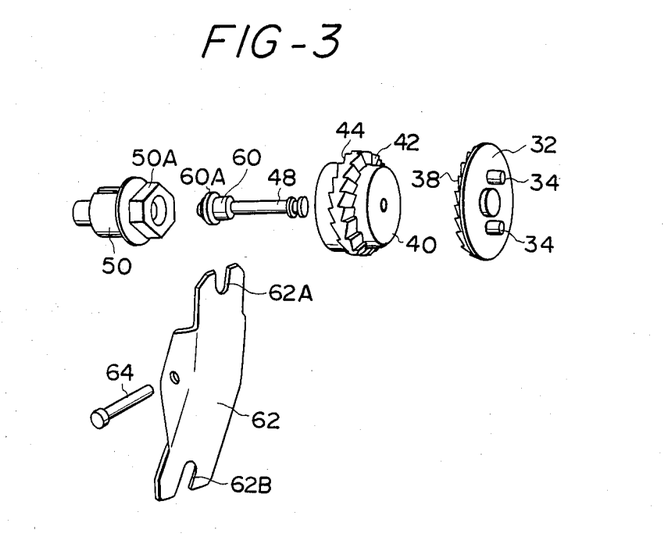
FIG. 3 is an exploded perspective view of a clutch means and its associated elements employed in the embodiment of the invention.

A base plate 26 is secured to the outside of the leg plate 18. A ring 30 is secured to the base plate 26 by a screw 28. Further, a rotary plate 32 is rotatably supported by the ring 30 in coaxial relation to the webbing takeup shaft 22. As also shown in FIG. 3, the rotary plate 32 has a pair of pins 34 projecting toward the webbing takeup shaft 22. These pins 34 are respectively inserted into engagement holes 36 which are formed in the webbing takeup shaft 22 in such a manner as to extend from its axial end and in parallel to the axis thereof. Accordingly, the rotary plate 32 is rotatable together with the webbing takeup shaft 22.

The rotary plate 32 has a double-helical gear 38 formed on the side surface thereof which is remote from the webbing takeup shaft 22.

The double-helical gear 38 opposes a double-helical gear 42 which is formed on one of the side surfaces of a clutch plate 40 which is rotatably supported in coaxial relation to the webbing takeup shaft 22. The clutch plate 40 is formed on the other side surface thereof with a double-helical gear 44 which opposes a double-helical gear 46 formed on a portion of the ring 30.

The clutch plate 40 has a clutch shaft 48 extending through its axis and secured thereto. The clutch shaft 48 has its axial center rotatably supported by a rotating shaft 50 in such a manner that the clutch shaft 48 is movable axially of the rotating shaft 50. A compression coil spring 52 is interposed between the clutch plate 40 and the rotating shaft 50, whereby the clutch plate 40 is biased in the direction in which the double-helical gear 42 is engaged with the double-helical gear 38. However, as the clutch plate 40 is moved against the biasing force of the compression coil spring 52, the gear 42 is disengaged from the gear 38 and the double-helical gear 44 on the clutch plate 40 is then engageable with the double-helical gear 46 on the ring 30.

A spring seat 54 is rotatably supported by the base plate 26 through the ring 30, and a spring case 56 is secured to the spring seat 54. The spring seat 54 and the spring case 56 are rotatably supported by the rotating shaft 50, while the rotating shaft 50 abuts against the spring seat 54 and the spring case 56 and is thereby prevented from moving in its axial direction. Further, the outer peripheral portion 50A of the rotating shaft 50 on the side thereof which is closer to the clutch plate 40 is formed into a hexagonal shape and fitted into a hexagonal hole 40A which is formed in the clutch plate 40. Furthermore, the rotating shaft 50 retains the inner end of a spiral spring 58 which is housed in the spring case 56. The outer end of the spiral spring 58 is retained by the spring case 56.

Thus, the rotating shaft 50 transmits the biasing force of the spiral spring 58 to the clutch plate 40 through the connection between the hexagonal outer peripheral portion 50A of the rotating shaft 50 and the hexagonal hole 40A of the clutch plate 40, and the clutch plate 40 transmits the biasing force thus transmitted to the rotary plate 32 through the engagement between the double-helical gears 38 and 42, whereby the webbing takeup shaft 22 is rotated in the direction in which the webbing 24 is wound up. However, when the gear 42 of the clutch plate 40 is separated from the gear 38, the biasing force of the spiral spring 58 is no longer applied to the webbing takeup shaft 22, that is, the biasing force for winding up the webbing 24 is cancelled. In the state wherein the gear 42 is separated from the gear 38, the gear 44 is engaged with the gear 46, whereby the biasing force of the spiral spring 58 is retained.

A sleeve 60 is rotatably supported at the end portion of the clutch shaft 48 which projects from the spring case 56. The sleeve 60 is inserted into a U-shaped groove 62A which is formed at one of the ends of a locker arm 62. The locker arm 62 pivoted by the base plate 26 through a pin 64 and a bracket 66. When the locker arm 62 pivots in the counterclockwise direction as viewed in FIG. 1, it engages with a collar 60A which is formed on the sleeve 60 and moves the clutch shaft 48 leftwardly as viewed in FIG. 1, that is, in the direction in which the compression coil spring 52 is compressed.

A solenoid shaft 68 is received in a U-shaped groove 62B which is formed at the other end of the locker arm 62. One of the ends of the solenoid shaft 68 extends into a solenoid 70 which serves as a driving means and is secured to the leg plate 18. Thus, when the solenoid 70 is actuated such as to attract the end, that is, the proximal end, of the solenoid shaft 68, a collar 68A which is formed at the distal end of the solenoid shaft 68 abuts against the locker arm 62 and pivots the latter counterclockwise as viewed in FIG. 1.

Figure 4:
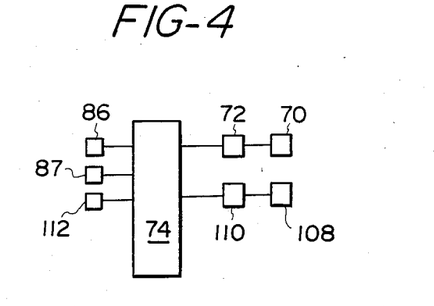
FIG. 4 is a diagram of a control circuit employed in the embodiment of the invention.

The solenoid 70 is, as also shown in FIG. 4, connected to a microcomputer 74 through a driver 72 such as a relay.

Figure 5:
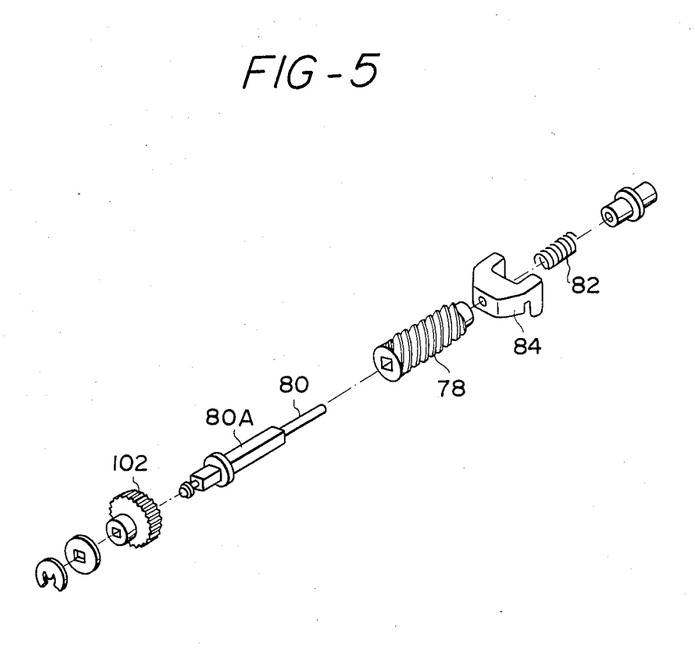
FIG. 5 is an exploded perspective view of a worm and its associated elements employed in the embodiment of the invention.

On the other hand, the spring case 56 is, as shown in FIG. 2, formed on its outer periphery with a worm wheel 76 which is engaged with a worm 78 rotatably supported by the base plate 26. As also shown in FIG. 5, the worm 78 is rotatably supported by the base plate 26 through a shaft 80 and is biased in one of its axial directions by means of the biasing force of a compression coil spring 82 which is interposed between the worm 78 and the base plate 26. The arrangement is such that, as the tension of the webbing 24 is increased, the worm 78 is moved in its axial direction against the biasing force of the compression coil spring 82.

However, since the worm 78 is fitted on a rectangular portion 80A which is formed on the outer periphery of the shaft 80, there is no possibility of the worm 78 rotating relative to the shaft 80 around the axis thereof.

A striker 84 which has a two-pronged distal end is slidably supported on the shaft 80. When the compression coil spring 82 is axially moved, the striker 84 is simultaneously moved and actuates detection switches 86 and 87. The striker 84 is prevented from rotating by means of a stopper (not shown) which projects from the base plate 26.

The detection switch 86 has a fixed contact 88 which opposes one of the pronged end portions of the striker 84 and a movable contact 90 which comes in and out of contact with the fixed contact 88, while the detection switch 87 has movable contacts 92 and 94 which are provided such as to oppose the other pronged end portion of the striker 84 and to come in and out of contact with each other. The movable contacts 90, 92 and 94 are partially elongated such as to form arms 96, 98 and 100 which respectively oppose the pronged end portions of the striker 84.

FIG. 2 shows a state wherein the fixed and movable contacts 88, 90 and the movable contacts 92, 94 are respectively in contact with each other and consequently the detection switches 86 and 87 are closed. This state represents the fact that the degree of webbing tension is median between the maximum and the minimum and thus the fact that the occupant of the vehicle is in a webbing fastened condition. In this state, the striker 84 is close to the arms 96 and 100. When under this state the webbing tension is increased, the striker 84, together with the worm 78, is moved rightwardly as viewed in FIG. 2, while compressing the compression coil spring 82. In consequence, the movable contact 90 is separated from the fixed contact 88 and the switch 86 is thereby opened. In this state, the striker 84 is not in contact with the arm 98. When the webbing tension is further increased such as to reach its maximum, the striker 84 causes the arm 98 to move in such a manner that the movable contact 94 is separated from the movable contact 92.

On the other hand, when the webbing tension becomes substantially zero under the state shown in FIG. 2, the compression coil spring 82 causes the striker 84 to move leftwardly as viewed in FIG. 2. Consequently, the arm 100 is moved in such a manner that the movable contact 92 is separated from the movable contact 94.

Thus, the detection switches 86 and 87 are capable of detecting four different states, that is, a normal state wherein the occupant is in a webbing fastened condition, a state wherein the webbing tension is slightly increased, a state wherein the webbing tension is maximumly increased, and a state wherein there is substantially no webbing tension.

The detection switches 86 and 87 are adapted to deliver their respective detection signals to the microcomputer 74 as shown in FIG. 4.

The shaft 80 has a pinion 102 secured to its opposite side relative to the striker 84. The pinion 102 is engaged with a pinion 106 through an intermediate gear 104. The pinion 106 is connected to the output shaft of a reversible motor 108 which is secured to the base plate 26. The motor 108 serves as a winding means which winds up the spiral spring 58 to thereby increase the webbing wind-up force. The motor 108 is, as shown in FIG. 4, connected to the microcomputer 74 through a driver 110, such as a relay, so as to be controlled thereby.

It is to be noted that a signal from a door switch 112 is transmitted to the microcomputer 74 as shown in FIG. 4, whereby it is possible to make judgement as to whether the door is open or closed. Further, an inertial locking mechanism 116 is provided on the leg plate 20 of the webbing retractor 10, whereby the rotation of the webbing takeup shaft 22 in the webbing wind-off direction is instantaneously suspended when a vehicular emergency occurs. In addition, a cover 120 is attached to the leg plate 18.

Figure 6:
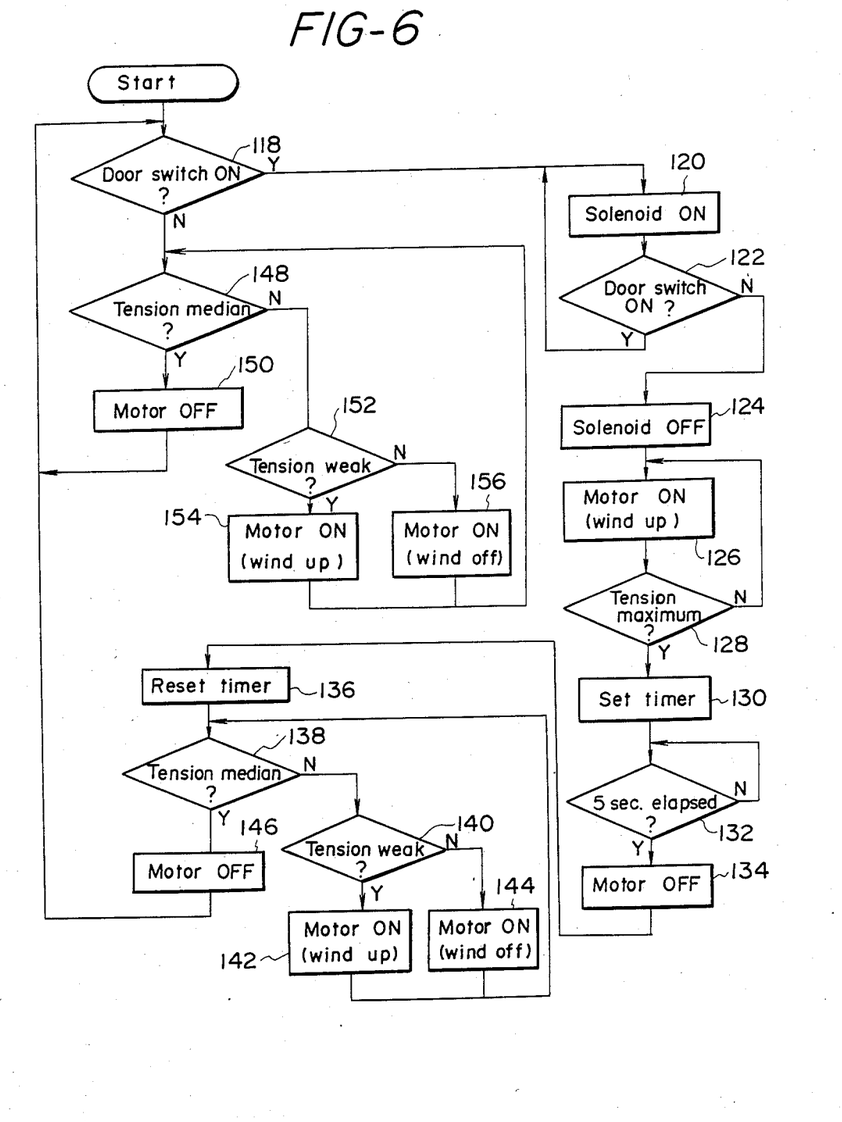
FIG. 6 is a flow chart showing the control procedure for the embodiment of the invention.

The operation of the thus arranged embodiment will now be described with reference to FIG. 6.

A judgement is made in a step 118 as to whether the vehicle door is open or closed. When the door is opened, the solenoid 70 is excited in a step 120. Thereupon, the locker arm 62 causes the clutch plate 40 to move leftwardly as viewed in FIG. 1 through the clutch shaft 48, so that the double-helical gear 42 is separated from the double-helical gear 38, while the double-helical gear 44 is engaged with the double-helical gear 46. In consequence, the webbing wind-up biasing force of the spiral spring 58 is no longer applied to the webbing takeup shaft 22 and is retained by virtue of the engagement between the double-helical gears 44 and 46.

When the solenoid 70 is excited as the result of execution of the step 120 and the webbing wind-up biasing force which has been applied to the webbing takeup shaft 22 is cancelled, a judgement is made again in a step 122 as to whether the door is open or closed. If the door is still open, the excited state of the solenoid 70 is maintained in accordance with the instruction of the step 120. For this reason, there is no possibility of the webbing wind-up biasing force of the spiral spring 58 being applied to the webbing takeup shaft 22 when the door is open.

When the occupant opens the door for the purpose of leaving the vehicle, the webbing 24 is moved toward the front end of the vehicle in response to the pivoting movement of the opening door, thereby allowing the occupant to be automatically released from the webbing fastened condition. However, in the conventional webbing retractors, since the biasing force of the spiral spring 58 is acting on the webbing 24 during the above-described movement of the webbing 24, the biasing force of the spiral spring 58 undesirably acts on the webbing 24 such as to provide resistance to the actuating force for opening the door. In this embodiment, however, when the door is opened, the tension of the webbing 24 is immediately decreased and, therefore, the actuating force required for opening the door is reduced correspondingly. Further, since substantially no tension is applied to the webbing 24, there is no risk of the webbing 24 rubbing against the body of the occupant, which fact allows the occupant to leave the vehicle comfortably and speedily.

When the occupant closes the door after entering the vehicle, this fact is acknowledged in the step 122, and the excitation of the solenoid 70 is cancelled in a step 124. In consequence, the clutch shaft 48 is caused to move the clutch plate 40 by means of the biasing force of the compression coil spring 52, whereby the double-helical gear 44 is separated from the double-helical gear 46, while the double-helical gear 42 is reengaged with the double-helical gear 38. As a result, the biasing force of the spiral spring 58 is applied to the webbing takeup shaft 22 again, and any deflection of the webbing 24 is thereby removed.

At the same time, the motor 108 is actuated in a step 126. In consequence, the worm wheel 76 is rotated and the spiral spring 58 is thereby wound up, whereby the webbing wind-up force is increased. The webbing wind-up force is increased until the striker 84 shown in FIG. 2 causes the movable contacts 90 and 94 to be respectively separated from the fixed contact 88 and the movable contact 92, that is, until the webbing tension reaches its maximum. When the webbing tension reaches its maximum, this fact is acknowledged in a step 128, and a timer is set in a step 130. When it is judged in a step 132 that the time (for example, five seconds) set on the timer has elapsed, the motor 108 is suspended in a step 134. Thus, when the occupant closes the door after entering the vehicle, the occupant is speedily secured by the webbing 24. When the occupant closes the door after getting out of the vehicle, it is also possible to remove any deflection of the webbing 24 in a manner similar to the above.

Thereafter, the timer is reset in a step 136, and a judgement is then made in a step 138 as to whether or not the webbing tension is at a median point between the maximum and the minimum, that is, as to whether or not the respective pairs of contacts of the detection switches 86 and 87 are both in contact with each other as shown in FIG. 2. If the contacts are not in contact with each other, a judgement is made in a step 140 as to whether or not the movable contacts 92 and 94 are separated from each other. If so, the motor 108 is actuated again in a step 142 such as to wind up the webbing 24 until the webbing tension reaches a median point. If the movable contacts 92 and 94 are in contact with each other, this represents the fact that the fixed contact 88 and the movable contact 90 are in contact with each other, that is, that the detection switch 86 is closed. The motor 108 is therefore rotated reversely in a step 144 such as to decrease the webbing tension, and the process returns to the step 138.

When the webbing tension is judged to be medium in the step 138, the motor 108 is suspended in a step 146.

Thereafter, the process returns to the step 118, in which the door is judged to be open or closed. If the door is closed, a judgement is made again in a step 148 as to whether or not the webbing tension is median. If so, the motor 108 is suspended in a step 150, and the process then returns to the step 118. If the webbing tension is judged not to be median in the step 148, the process returns to the step 148 through steps 152, 154 and 156 which are similar to the steps 140, 142 and 144.

Thus, when the occupant opens the door for the purpose of leaving the vehicle, the webbing tension is decreased. It is therefore easy for the occupant to leave the vehicle. On the other hand, when entering the vehicle, it is possible for the occupant to enter the vehicle in a state wherein the webbing tension is decreased and to be speedily secured by the webbing simply by closing the door after entering the vehicle.

It is to be noted that, when the vehicle is running, since the webbing tension is median, the webbing 24 is in close contact with the occupant in an appropriate state, and when a vehicular emergency occurs, the inertial locking mechanism 116 is actuated such as to bring the occupant into a reliable webbing fastened condition. Moreover, it is also possible to decrease the webbing tension when the vehicle is running by reversing the motor 108 according to need.

It is to be noted also that, although a reversible motor is employed in the above-described embodiment, it is also possible to employ a motor designed for unidirectional rotation which winds up the spiral spring only in the direction in which the webbing tension is increased.

What is claimed is:

1. A webbing tension adjusting apparatus for a webbing retractor in which a takeup shaft for winding up an occupant restraining webbing is biased in the webbing wind-up direction by a resilient member, said apparatus comprising:
    (a) clutch means interposed between said takeup shaft and said resilient member;
    (b) winding means capable of increasing the biasing force of said resilient member, said winding means being a motor which is actuated to wind up the outer end of a spiral spring which serves as said resilient member; and
    (c) driving means for disengaging said clutch means when the associated vehicle door is opened, whereby the biasing force of said resilient member is prevented from acting on said takeup shaft when said door is opened, thereby decreasing the webbing tension and allowing the occupant to easily enter and leave the vehicle.

2. A webbing tension adjusting apparatus according to claim 1, wherein, when said clutch means is in a disengaged state, it retains said resilient member.

3. A webbing tension adjusting apparatus according to claim 1, wherein said clutch means includes a clutch plate on which the biasing force of said resilient member acts and which is formed with a gear that comes in and out of engagement with a gear which is formed on said takeup shaft.

4. A webbing tension adjusting apparatus according to claim 3, wherein said clutch plate is biased in the direction in which the gear formed on said clutch plate is engaged with the gear formed on said takeup shaft.

5. A webbing tension adjusting apparatus according to claim 4, wherein said clutch plate is connected with the inner end of a spiral spring which serves as said resilient member, whereby the biasing force of said spiral spring is transmitted to said clutch plate.

6. A webbing tension adjusting apparatus according to claim 4, wherein said driving means includes a clutch shaft axially extending through a rotating shaft which is connected with the inner end of a spiral spring serving as said resilient member, said clutch plate being separated from said takeup shaft by the axial movement of said clutch shaft.

7. A webbing tension adjusting apparatus according to claim 1, further comprising means for detecting the degree of webbing tension, whereby said winding means is controlled in accordance with the detected webbing tension.

8. A webbing tension adjusting apparatus according to claim 7, wherein said webbing tension detecting means is capable of detecting at least three stages of the webbing tension in terms of the magnitude thereof.

9. A webbing tension adjusting apparatus according to claim 8, further comprising a controller by which the degree of webbing tension is tentatively made maximum after said door has been closed.

10. A webbing tension adjusting apparatus according to claim 9, wherein said detecting means detects the degree of webbing tension on the basis of the axial movement of a worm which is engaged with a worm wheel secured to the outer end of a spiral spring which serves as said resilient member.

11. A webbing tension adjusting apparatus for use in a seatbelt system designed to protect an occupant of a vehicle, said apparatus comprising:
    (a) a frame secured to the body of said vehicle;
    (b) a takeup shaft rotatably supported by said frame to wind up an occupant restraining webbing;
    (c) a spring case supported by said frame;
    (d) a spiral spring housed in said spring case and having its outer end retained by said spring case;
    (e) a rotating shaft connected with the inner end of said spiral spring;
    (f) a clutch plate connected to said rotating shaft to receive the biasing force of said spiral spring, said clutch plate being movable relative to said rotating shaft in the axial direction thereof;
    (g) engagement means provided between said clutch plate and said takeup shaft to transmit the biasing force of said spiral spring to said takeup shaft;
    (h) driving means for moving said clutch plate relative to said rotating shaft in the axial direction thereof when an associated door is opened to thereby disengage said engagement means, whereby it is possible for said door to be smoothly opened, and the friction occurring between said webbing and the body of said occupant is reduced; and
    (i) winding means for winding up said spiral spring by driving said spring case.

12. A webbing tension adjusting apparatus according to claim 11, wherein, when said engagement means is in a disengaged state, said clutch plate retains said resilient member.

13. A webbing tension adjusting apparatus according to claim 11, wherein said clutch plate is biased in the direction in which a gear which is formed on said clutch plate is engaged with a gear which is formed on said takeup shaft.

14. A webbing tension adjusting apparatus according to claim 11, further comprising means for detecting the webbing tension, whereby said winding means is controlled in accordance with the detected webbing tension.

15. A webbing tension adjusting apparatus according to claim 14, wherein said webbing tension detecting means is capable of detecting at least three stages of the webbing tension in terms of the magnitude thereof.

16. A webbing tension adjusting apparatus according to claim 15, wherein said detecting means detects the webbing tension on the basis of the axial movement of a worm which is engaged with a worm wheel secured to the outer end of said spiral spring.

17. A webbing tension adjusting apparatus according to claim 11, wherein said driving means includes a clutch shaft which axially extends through said rotating shaft and is connected to said clutch plate.

18. An apparatus employed in a seatbelt system for a vehicle to adjust the tension of an occupant restraining webbing, said apparatus comprising:
    (a) clutch means interposed between a takeup shaft and a resilient member and adapted to be able to disengage said resilient member from said takeup shaft and to retain said resilient member in this disengaged state;
    (b) winding means capable of increasing the biasing force of said resilient member; and
    (c) driving means for disengaging said clutch means when an associated vehicle door is opened, whereby the biasing force of said resilient member is prevented from acting on said takeup shaft when said door is opened, thereby decreasing the webbing tension and allowing the occupant to easily enter and leave the vehicle.

19. An apparatus according to claim 18, wherein said clutch means includes a clutch plate on which the biasing force of said resilient member acts and which is formed with a gear that comes in and out of engagement with a gear which is formed on said takeup shaft, said clutch plate being biased in the direction in which the gear formed on said clutch plate is engaged with the gear formed on said takeup shaft.

20. An apparatus according to claim 19, wherein said clutch plate is connected with the inner end of a spiral spring which serves as said resilient member, whereby the biasing force of said spiral spring is transmitted to said clutch plate, and wherein said winding means is constituted by a motor which is actuated such as to wind up the outer end of said spiral spring.

21. An apparatus according to claim 18, further comprising means for detecting the webbing tension, said means being capable of detecting at least three stages of the webbing tension in terms of the magnitude thereof, whereby said winding means is controlled in accordance with the detected webbing tension.

22. An apparatus according to claim 21, further comprising a controller by which the degree of webbing tension is tentatively made maximum after said door has been closed.

* * * * *